(No Model.)

5 Sheets—Sheet 1.

H. M. KEITH.
COMBINED CORN PLANTER AND MARKER.

No. 283,253. Patented Aug. 14, 1883.

Witnesses:
Edmund Brodhag
Howell Battle

Inventor:
pro Horace Mason Keith
Johnson & Johnson
Atty

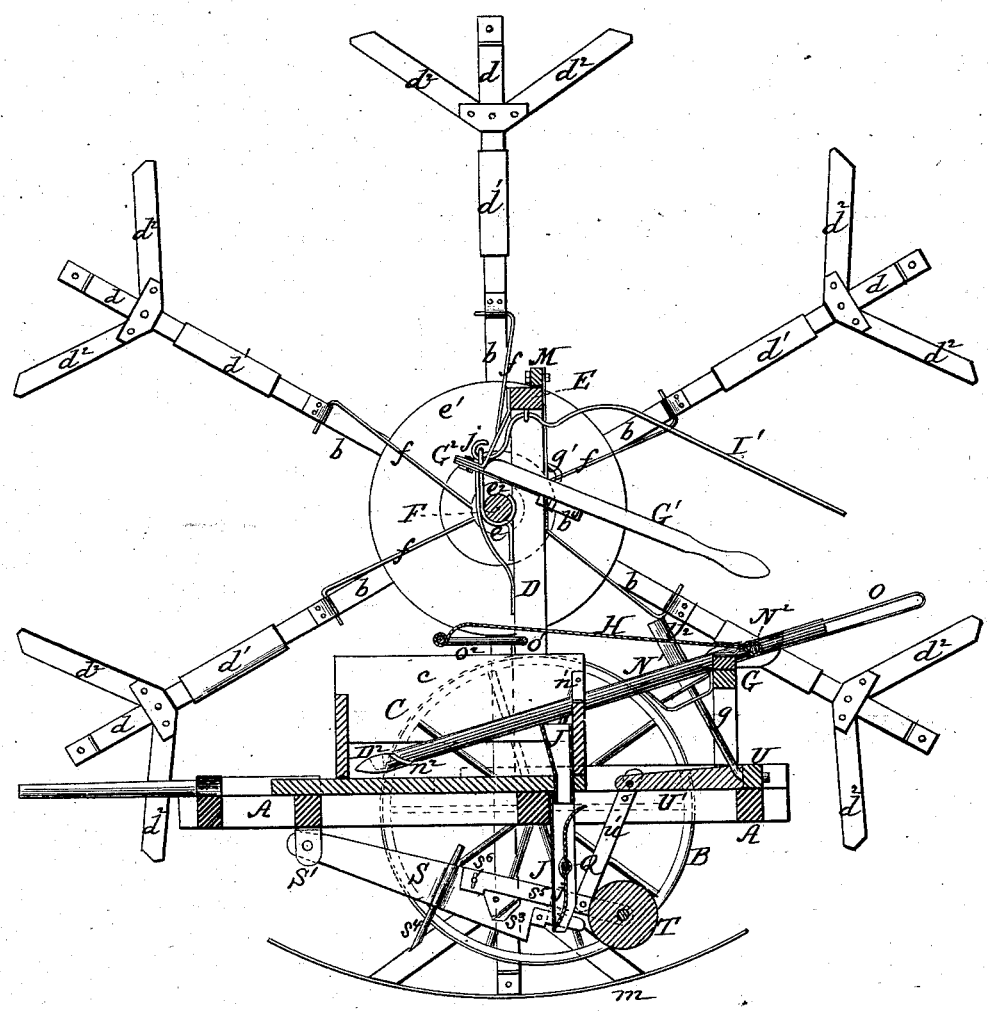
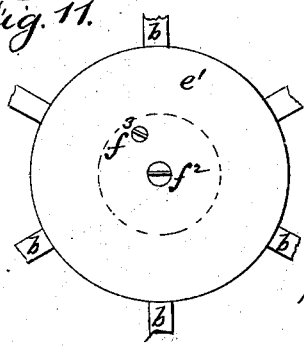

(No Model.)

5 Sheets—Sheet 3.

H. M. KEITH.
COMBINED CORN PLANTER AND MARKER.

No. 283,253. Patented Aug. 14, 1883.

Witnesses:
Edmund Brodhag
Howell Bartle

Inventor:
pro Horace Mason Keith,
Johnson & Johnson
Attys

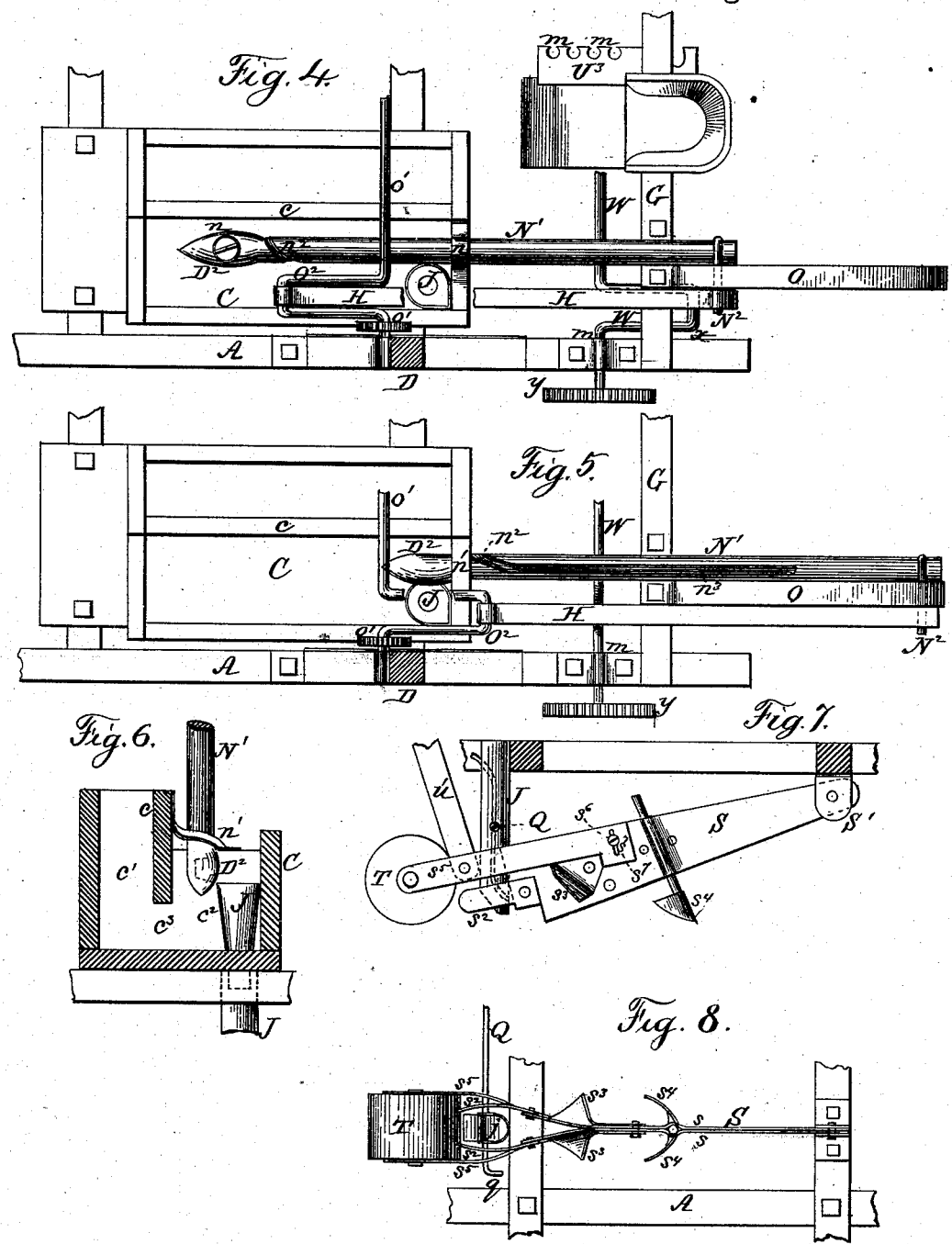

(No Model.) 5 Sheets—Sheet 5.

H. M. KEITH.
COMBINED CORN PLANTER AND MARKER.

No. 283,253. Patented Aug. 14, 1883.

Witnesses:
Edmond Brohag
Howell Bartle

Inventor:
pro Horace Mason Keith
Johnson & Johnson
(Attys)

UNITED STATES PATENT OFFICE.

HORACE MASON KEITH, OF COMMERCE, ASSIGNOR OF ONE-HALF TO JOEL P. HARGER, OF PONTIAC, MICHIGAN.

COMBINED CORN PLANTER AND MARKER.

SPECIFICATION forming part of Letters Patent No. 283,253, dated August 14, 1883.

Application filed November 17, 1882. (No model.)

*To all whom it may concern:*

Be it known that I, HORACE MASON KEITH, a citizen of the United States, residing at Commerce, Oakland county, State of Michigan, have invented new and useful Improvements in a Combined Corn Planter and Marker, of which the following is a specification.

My invention relates to a combined corn planter and marker, and the specific improvements which I have made in such combined implement will be pointed out in the claims.

The primary objects of the improvements are to provide for a regular and uniform dropping of the corn; to provide a check-wheel of such construction that its marking function will be regular and easy of regulation by the driver; to effect an automatic dropping of the corn coincident with the marking of a hill, and to improve the details of construction of combined machines of this character, whereby the opening of the soil, the coincident marking of the hills and dropping of the corn, and the covering of the latter may be effected, the adjustability and relative operative positions of the parts being under the control of the driver.

Figure 1:
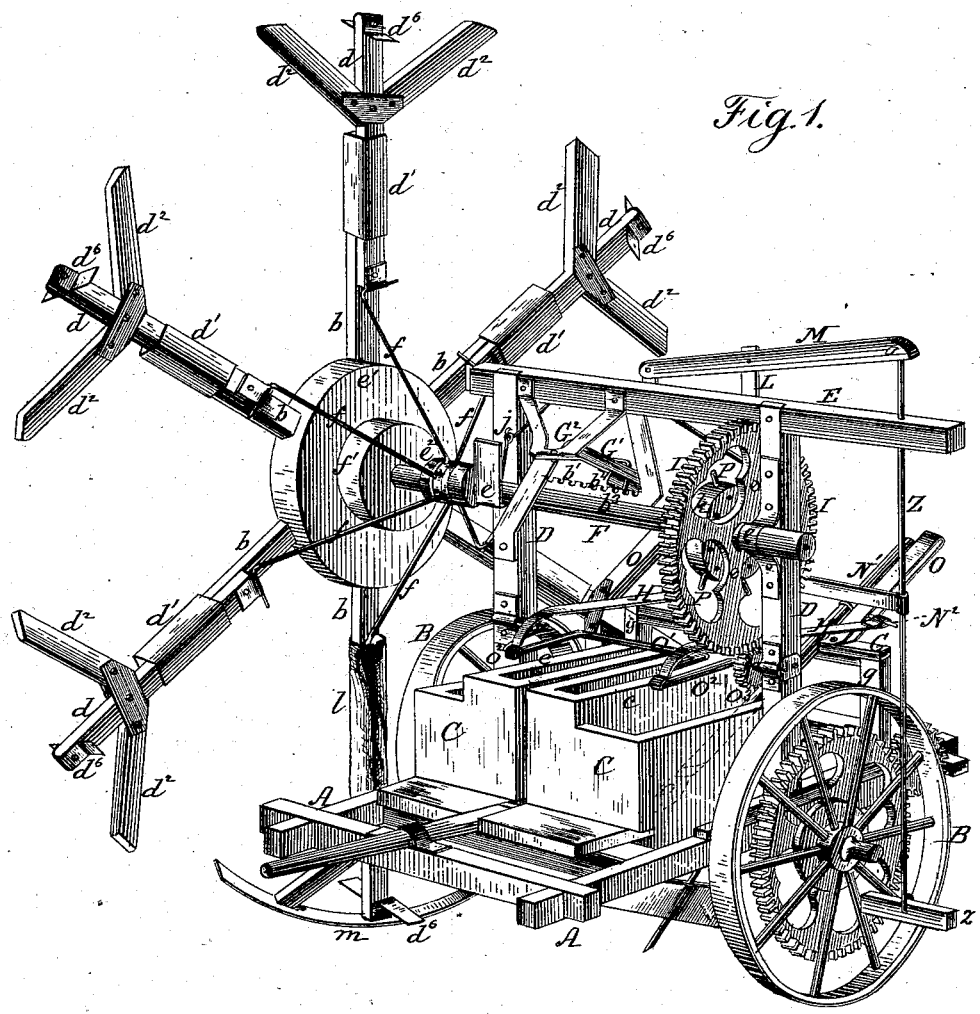
Figure 3:
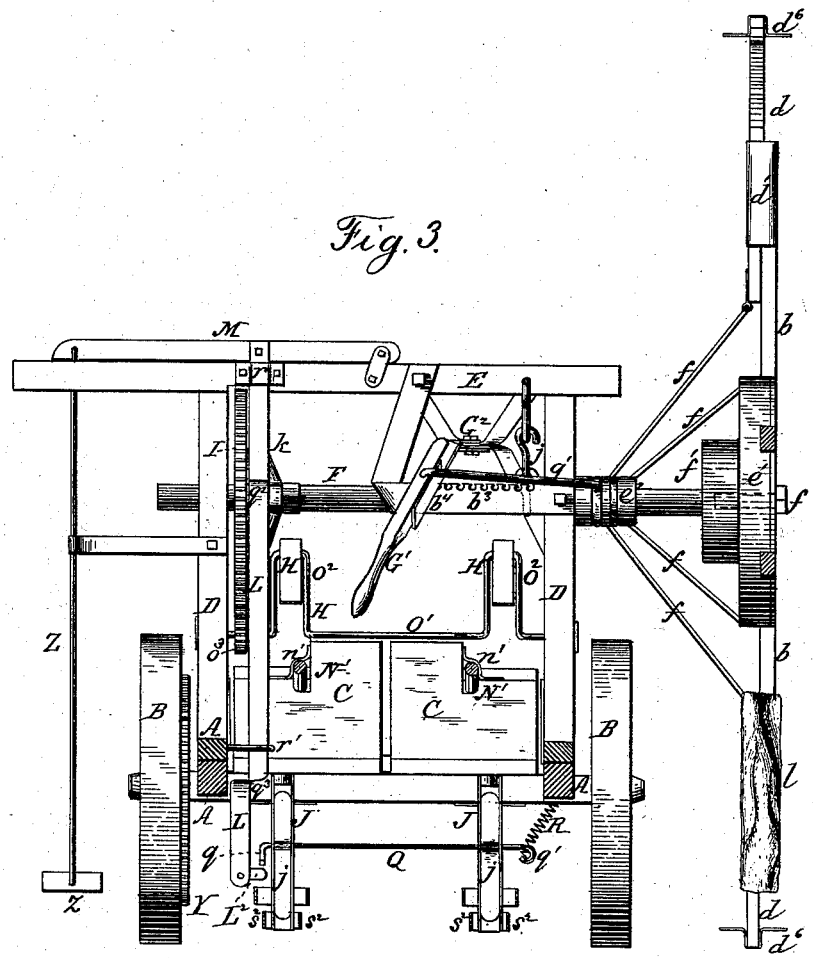
Figure 9:
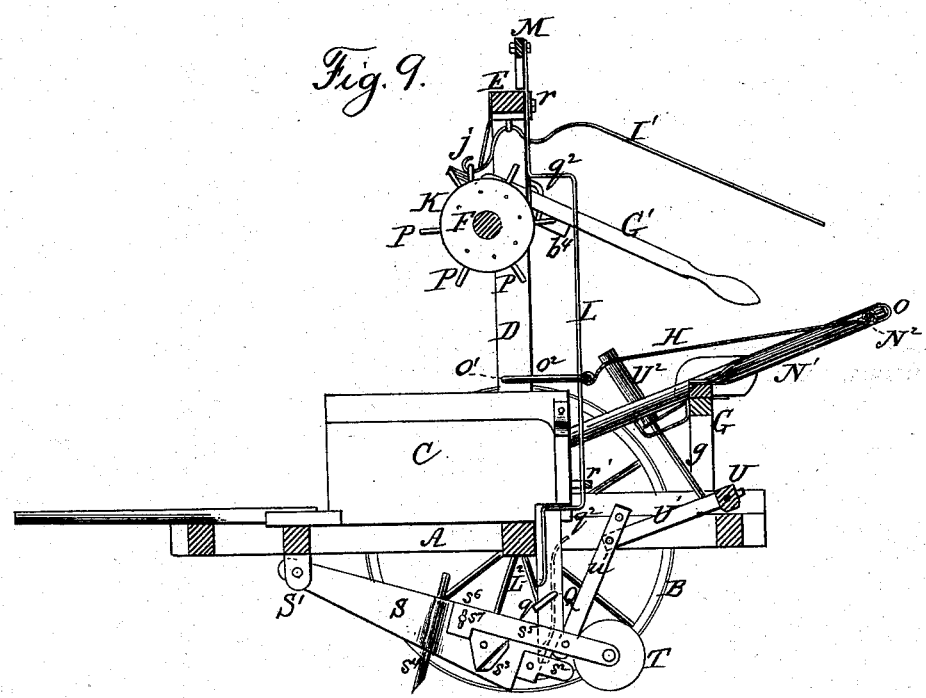
Figure 10:
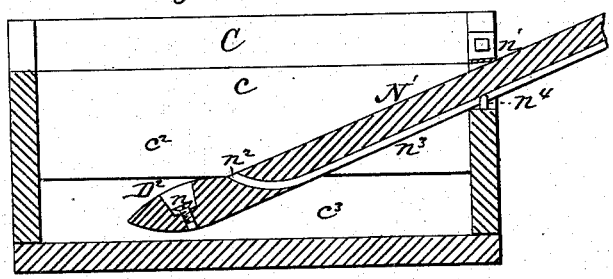

In the drawings, Figure 1 represents a perspective view of a machine constructed in accordance with my invention; Fig. 2, a vertical longitudinal section taken through the planting devices; Fig. 3, a vertical section taken at right angles to Fig. 2, looking at the rear; Fig. 4, a plan of one of the hoppers, the sliding and turning scoop being shown in the position to fill with corn; Fig. 5, a similar view, showing the scoop in position to discharge corn into the dropping-tube; Fig. 6, a cross-section of the hopper; Fig. 7, a side view of the drag-bar, and Fig. 8 a bottom view of the same; Fig. 9, a section of the machine, showing the device for operating the dropping-valves. Fig. 10 shows the sliding scoop, and Fig. 11 the hub of the marker.

The frame A of the machine is supported upon wheels B B, and carries hoppers C C for the corn. Upon each side of the frame is secured a standard, D, connected at their upper ends by a cross-bar, E, and having journal-bearings $e\ e$, within which turns the marker-shaft F, one end of which projects from the side of the machine to support the check-wheel, which will be described hereinafter. The hoppers C C are divided by partitions $c\ c$ into two compartments, $c'\ c^2$. The said partitions $c$ do not extend to the bottom of the hoppers, but are arranged sufficiently above the latter to leave an opening, $c^3$, Fig. 6, between the compartments $c'\ c^2$. The compartment $c'$ extends above the compartment $c^2$, and is to be filled with corn, from which it is automatically supplied to the compartment $c^2$, within which the dropping device operates through the opening $c^3$ at the bottom of the partition. While the supply-compartment of the hopper may be filled with corn, the latter cannot rise in the compartment from which the dropping is made above the lower edge of the partition; but said feed-compartment will always contain sufficient corn to supply the sliding receiving and dumping scoops, as will be further explained. These scoops $D^2\ D^2$ are arranged in the compartments $c^2$ of the hoppers, and are tapering or pointed to adapt them to readily pass through and under the corn in filling. The bottoms of these scoops or recesses are formed by screw-heads $n$, which may be turned to vary the holding capacity of the scoops, thus regulating the quantity of corn to be dropped in a hill. These pointed scoops are formed on the ends of bars $N'\ N'$, which extend through guides $n'\ n'$, arranged at the rear ends of the compartments of the hopper. These scoop-bars are each formed with a spiral groove, $n^2$, near its head, extended into a straight part, $n^3$, adapted to receive a pin, $n^4$, Fig. 10, set in the rear end of the hopper below the guide $n'$. The scoop-bars $N'\ N'$ are each provided, near their rear ends, with an arm, $N^2$, so connected as to permit the scoop-bars to revolve independent of said arms. The latter project at right angles from the scoop-bars and through inclined guides O, secured upon a cross-bar or seat-frame, G, supported at the rear of the machine by short posts $g$. The outer ends of the arms $N^2$ are secured to the rear ends of connecting-rods H, the forward ends of which connect with the cranks $O^2$ of a crank-shaft, O', supported in bearings on the front sides of the standards D D. At one end of the crank-shaft is mounted a pinion, $o^3$, which meshes with a gear-wheel, I, carried by the marker-shaft F, whose revolution operates the crank-shaft O'.

In the rear ends of the feed-compartments $c^2$ of the hoppers are arranged the upper ends of the dropping-tubes J J, the latter extending slightly above the lower edge of the partitions $c$ $c$, so that the corn contained in said outer compartments, and which is never above the lower edge of the partition, will not feed itself to the dropping-tubes. By the means thus described the scoops $D^2$ $D^2$, one for each hopper, are adapted to be slid forward on a downward incline, to be filled with corn, and then drawn backward, partially revolving in their backward movement through the medium of the spiral grooves $n^2$ and pins $n^4$ to discharge their contents into the upper ends of the dropping-tubes. The dropping-tubes J J are open at their rear sides, below the hoppers, and are each provided with a valve, $j$, whose lower end is bent forward to close the end of the tube. A transverse rod, Q, connects the valves $j$, and has one of its ends, $q$, bent at right angles to the rod, while its opposite end, $q'$, is bent to form a hook, to which is secured one end of a spring, R, the opposite end of the latter being secured to the adjacent side of the frame. This spring serves to keep the lower ends of the valves in contact with the tubes, to hold the corn in the latter until the valves are opened, by the means hereinafter explained.

Immediately in front of each dropping-tube J is arranged a drag-bar, S, pivoted at its forward end in brackets S' of the frame. This drag-bar I preferably construct of two sections, $s$ $s$, Fig. 8, bolted together, and diverging at their rear ends to receive coverers $s^2$, which embrace the lower end of the feed-tube J, and prevent any lateral play of the latter. In front of the coverers $s^2$, on either side of the drag-bar, are secured outwardly-turned wings $s^3$, which operate, in connection with openers or shoulders $s^4$, secured at about the center of the drag-bars, to open and prepare the soil to receive the corn. Above the wings and coverers of the drag-bar, on each side of the latter, is pivoted an arm, $s^5$, by a pivot, $s^6$. The forward ends of these arms are formed with slots $s^7$, adapted to receive a bolt upon which the forward ends of the arms may slide.

Between the rear ends of the arms $s^5$, and just in rear of the dropping-tube J, is mounted a packing-roller, T. The latter, by means of its supporting-arms $u'$, may be vertically adjusted to carry more or less of the weight of the machine, as desired, to pack the ground after the corn is dropped.

At the rear end of the machine a rock-shaft, U, is supported in bearings of the frame. This shaft is provided with arms U', which project forward, and are connected by pendent arms $u'$ $u'$ with the arms $s^5$ of the drag-bar. A hand-lever, $U^2$, is secured to the shaft U and extends upwardly to be easily reached by the driver, and is adapted to engage with the teeth of a notched plate, $U^3$, Fig. 4, arranged adjacent to the driver's seat. By means of this lever and rock-shaft and their connection the drag-bar may be vertically adjusted to regulate the depth of the corn-furrow and the pressure of the roller.

I will now describe the marking devices and the parts connected therewith for causing the dropping of corn coincident with the marking of the hills.

Upon the projecting end of the shaft F is adjustably secured a disk, $e'$, to which are secured a series of radial arms, $b$, provided at their outer ends with sleeves $d'$, adapted to receive the ends of arms $d$, which overlap the arms $b$, and are adapted to slide in said sleeves. A sliding collar, $e^2$, in the check-wheel side of the shaft F, is connected to the inner ends of the arms $d$ by means of a series of rods, $f$, so attached as to permit the arms $d$ to be moved in their sleeves by the movement of the collar. The latter is controlled through the medium of a rod, $g'$, one end of which surrounds the collar, while the opposite end is secured to a hand-lever, G', fulcrumed in a bracket, $G^2$, on the front side of the cross-bar E, and adapted to be secured in any desired position by means of a lip, $b^4$, catching in notches $b'$ of a rack, $b^3$, fastened to the standard D and cross-bar E. An open bracket-bearing, $e$, on one of the standards, allows the checker-shaft F to move vertically therein, said vertical movement being controlled by a link, $j$, hung to a bent lever, I', pivoted to the cross-bar E, and extending back, so as to be secured in a depressed position by engaging its ends in a notch, $m$, in a plate, $U^3$, at the side of the driver's seat. The sleeves $d'$ of the lapping arms $b$ may be surrounded by a piece of fabric, $l$, Fig. 1, of any suitable character to allow the movement of the arms $d$, and to protect the covered parts from dust or dirt. Each arm $d$ carries two secondary arms, $d^2$, arranged obliquely on said arms $d$, and of such a length that as the arm to which they are connected is lifted from the ground either one or the other of said oblique arms will come in contact with the ground, according to the direction in which the checker-disk $e'$ is revolving, so as to keep the end of the check-wheel shaft from rising and falling too much by the arms being too great a distance apart. As the wheel revolves these short arms, $d^2$, with the long ones, $d$, make eighteen steps or treads, instead of six, as would be the case if the short oblique arms were not used. The short arms nearly fill the spaces between the arms $d$, and cause the checker-shaft to run nearly level in its bracket-bearing.

Independent felly-sections $m$ may be secured to each arm $d$ and its secondary arm $d^2$, and a transverse strip, $d^6$, upon the end of the arm $d$, serves as a guard to limit the insertion of the arm in the soil. These sections $m$ do not connect and do not form a continuous felly around the wheel. Mounted on the marker-shaft F, near the end opposite to the disk $e'$, and turning with the marker-shaft, is a cog-wheel, I, and disk K, said cog-wheel meshing with the pinion $o^3$, actuating the crank-shaft O'. The disk K carries on its circumference a series of radial pins or projections, P, corresponding in number with the arms of the check-wheel. A bar, L, bent to form shoulders $q^2$ $q^3$, Figs. 3 and 9, the latter being adapted to be successively struck by the pins P of the disk K, is maintained in a vertical position by means of loops $r$ $r'$, through which its ends pass, the said loops being arranged, respectively, upon the cross-bar E and frame A of the machine.

On the side next the dropping-tubes, at the lower end of the drop-bar L, is an arm, $L^2$, Fig. 3, projecting inwardly from the bar a suitable distance to strike the bent end $q$ of the valve-rod Q, which end is bent down and slightly forward, so that the descent of the arm $L^2$ will strike it, turning said end $q$ of the valve-rod Q back and opening the valve $j$, when this arm $L^2$ will pass down past the bent end $q$ of the rod Q, coming up on the rear side of the latter. When the drop-bar is raised on the pins P, the arm $L^2$ will slip past behind the bent end of the rod Q, the valves being closed by the spring R at the opposite end of the valve-rod Q.

To the upper end of the arm L is centrally (or nearly so) attached a lever, M, pivoted at its inner end to the cross-bar E, and having at its outer end, on the side of the machine opposite to that which carries the check-wheel, a pendent marker-rod, Z, having at its lower end a cross-block or indicator, $z$, which will mark the ground on the opposite side of the machine from the check-wheel, which marks will guide the driver in driving back across the field to the starting-side of the latter.

The operation of the machine is as follows: The supply-compartments of the hopper being filled with corn, the machine is put in motion; the marker-wheel revolves, each marking-arm coming successively in contact with the ground. The movements of the machine are so regulated that in the interval between the period when one marking-arm leaves the ground and the succeeding arm comes fairly upon the ground the crank-shaft O', through the medium of its cranks, is forcing the scoops $D^2$ $D^2$, by their connecting-rods H, rearwardly and upwardly, filled with corn. Each scoop, as it is forced back, is caused to partially revolve by reason of the contact of the pin $n^4$ with the spiral groove. Thus the scoop, being filled with corn, will be inverted and deposit in the dropping-tube J a sufficient quantity of corn for one hill. As this operation is taking place one of the pins P on the disk K is raising the drop-bar L, having come in contact with the shoulder $q^2$ of the same. The next marking-arm having fairly reached the ground, the crank-shaft O' will move the scoops back to their original position. The pin P will clear the shoulder $q^2$ of the drop-bar L, which latter drops by its weight, the inwardly-projecting arm $L^2$ striking the bent end $q$ of the valve Q, as above explained, partially turning the same, and thereby causing the lower ends of the valves to be moved away from the tubes, opening the end of the latter and permitting the corn deposited therein to drop out. The valves are then closed by the spring R, as already explained. At this juncture another of the pins P will come in contact with the shoulder $q^2$ of the bar L, and the operation is repeated. The operator regulates by the hand-lever $U^2$ the depth of the cut of the drag-bar and its openers, the wings of said drag-bar operating to spread the earth on either side. The curved coverers $S^2$, embracing the dropping-tubes, hold the drag-bar in proper relation thereto and gather the earth and cover up the corn dropped, and, finally, the rollers pass over the hills and pack the earth upon the corn.

The diameter of the check-wheel may be increased or decreased, as desired, by means of the lever G', thus preventing overstepping or understepping of the marks, which frequently occurs in this kind of machines.

Marker-wheels frequently extend lower than the plane in which the peripheries of the carrying-wheels move. Consequently when the arms of the marker come in contact with the ground they force or lift that side of the machine, thereby subjecting the marker, its journal-bearings, and parts connected thereto to great strain, thus weakening and injuring the machine. I overcome this objection by simply depressing the lever I', connected to the marker-shaft by the link $j$, which causes the marker-shaft to be moved vertically in its open bracket-bearing $e$, thus allowing the wheel to clear the ground when the machine is not in use.

If desired, the sliding and partially-revolving scoops $D^2$ $D^2$ may be operated independent of the marker-shaft by arranging in rear of the hoppers a crank-shaft, W, Fig. 4, supported in bearings $m$ on the sides of the frame, and provided with cranks X, to which the scoop-bars may be connected.

Upon one end of the shaft W is arranged a pinion, $y$, meshing with a cog-wheel, Y, mounted on one of the carrying-wheels.

The hub $e'$ of the marker-wheel is fastened to the collar $f'$ on the end of the shaft F by a large screw, $f^2$, on which it can be turned to adjust or set the marker-wheel arms, and when so set the marker is secured to the shaft-collar $f'$ by a clamp-screw, $f^3$, Fig. 11, so that the arms will come vertical over the mark at the proper time. This construction allows the shaft F to be turned to adjust the operation of the valves without turning the marking-wheel from its proper position, whereby the machine must do its work correctly. If the marker-wheel should not stand, at starting, in proper relation to the shaft, the corn would not be dropped at the mark.

The packing-roller can be set higher or lower, and thereby cause the furrow-opening bar S to run more or less in the ground.

I claim—

1. In a corn-planter, the combination of a hopper and a dropping-tube arranged therein, with a scoop carried by a rod supported upon the hopper, a suitable guide for said rod, and means, substantially such as described, whereby said scoop is caused to have a downwardly-inclined sliding movement into the hopper, and to be withdrawn therefrom in an upwardly-inclined path and partially revolved upon its support to deliver the corn into the dropping-tube, substantially as described, for the purpose specified.

2. In a corn-planter, the combination, with the frame, of a hopper consisting of compartments divided by a partition whose lower edge is arranged above the floor of the hopper to admit of the feed of the corn from one compartment to the other, a tube whose upper end is arranged within the feed-compartment of the hopper, and a sliding scoop arranged at an angle to said hopper, and means for sliding and partially revolving the scoop, substantially as set forth.

3. In a corn-planter, the combination, with the hopper, of a scoop-bar arranged at an incline to the hopper, and means, substantially as described for sliding and partially rotating said scoop.

4. In a corn-planter, the combination, with the hopper having the dropping-tube connected thereto, of a pointed sliding scoop provided with a controlling and guiding bar, and means whereby said scoop is filled by being automatically forced under the grain in the feed-compartment of the hopper, and then withdrawn and partially revolved to discharge its contents into the dropping-tube, substantially as set forth.

5. In a corn-planter, the combination, with the hopper, of the dropping-tube, a sliding scoop having an enlarged mouth, and a rearwardly-extending guide-bar provided with a spiral groove adapted to a pin of the hopper, an inclined guide, and an arm traveling in said guide and connecting said scoop-bar to an operating-rod in such a manner as to admit of the revolving of the handle, substantially as set forth.

6. In a corn-planter, the combination, with the hopper, of the dropping-tube, and a sliding scoop provided with a set-screw for regulating the depth of the scoop, and with means for sliding and partially revolving the scoop, substantially as set forth.

7. In a combined corn planter and marker, the combination, with the frame and marker-shaft provided with a cog-wheel, and a disk arranged concentric with the latter, and provided with radial pins, of a double-crank shaft supported in bearings on the frame, and provided with a pinion adapted to mesh with said gear-wheel, feeding-scoops, and connections for operating the latter, and a drop-bar arranged to be operated by said disk, and provided with an inwardly-projecting arm adapted to engage with the bent end of a rod which opens the valves of the dropping-tubes, substantially as set forth.

8. In a corn planter and marker, the combination, with the marker and with the corn-hopper, of a scoop provided with a rearwardly-extending bar, and a spiral groove to engage a stud or pin of the hopper, a crank-shaft adapted to be operated from the marker-shaft, and a connecting-rod and guide, whereby the scoop may be drawn backward and partially turned to dump its contents into the upper end of the dropping-tube, substantially as set forth.

9. The combination, with the standards D D, their cross-bar E, and the marker-shaft F, of the drop-bar L, and a lever, M, pivoted to said cross-bar F, and receiving the upper end of the drop-bar L, and a pendent rod, Z, secured to the outer end of said lever, and provided at its lower end with a marking-block, substantially as set forth.

10. In a corn-planter, the combination, with the frame, of a drag-bar pivoted at its forward end thereto, and provided at its rear end with outwardly-turned wings and arms, the latter being centrally pivoted to the sides of the drag-bar, and slotted at their forward ends to adapt them to be adjusted on a bolt passing through the drag-bar and supporting their rear ends, a packing-roller, and connected with devices for vertically moving the drag-bar, substantially as set forth.

11. In a corn-planter, the combination, with the drag-bar, pivoted to the front end of the frame, and its connections, of pendent arms pivoted to inwardly-projecting arms of a rock-shaft, the latter being journaled in bearings at the rear of the frame and provided with a hand-lever, substantially as set forth.

12. In a combined corn planter and marker, the combination, with the marker-shaft, of a check-wheel having a central disk, radial arms, the latter consisting of rigid inner sections and sliding outer sections, and means for operating the latter, substantially as set forth.

13. In a combined corn planter and marker, the combination, with the marker-shaft, of a check-wheel mounted on one end of said shaft, and consisting of a disk or hub, radial inner arms rigidly secured to said disk, and outer arms overlapping and sliding upon said inner arms, and means for operating the latter, substantially as set forth.

14. In a combined corn planter and marker, the combination, with the marker-shaft, of a check-wheel consisting of a central disk or hub, radial inner arms rigidly secured thereto, and provided at their outer ends with guide loops or sleeves, and outer arms arranged to slide in said sleeves, and provided with means for operating them from the machine, substantially as set forth.

15. In a marker, the combination, with the series of overlapped arms controlled from the machine, of a sack or covering adapted to prevent the accumulation of dust in the joints of the arms, substantially as set forth.

16. In a combined marker and planter, a marker-wheel having a series of radial arms, each of which is provided with two secondary arms arranged obliquely thereon, substantially as set forth.

17. The combination, with the radial arms $b$ of the marker-wheel, of the radial arms $d$, sliding upon the arms $b$, and obliquely-placed arms $d^2$, substantially as set forth.

18. The combination, with the marker-shaft F, carrying the check-wheel, of the standards D D and their cross-bar E, lever I', pivoted to the said bar, link $j$, and bracket-bearing $e$, whereby one end of said marker-shaft may be raised, for the purposes substantially as set forth.

19. In a marker, the combination, with a disk, of a series of arms having sleeves at their inner ends, and a series of secondary arms sliding in said sleeves and controlled by means of connection with a collar sliding on the marker-shaft, and a hand-lever attached thereto, substantially as set forth.

In testimony whereof I have hereunto set my hand in the presence of two subscribing witnesses.

HORACE MASON KEITH.

Witnesses:
N. H. SHEPHERD,
F. G. JACOBS.